No. 834,225. PATENTED OCT. 23, 1906.
V. W. BLANCHARD.
STEAM COOKING APPARATUS.
APPLICATION FILED JAN. 22, 1906.

WITNESSES:

INVENTOR
Virgil W. Blanchard
By Alexander␣␣Powell
Attorneys

UNITED STATES PATENT OFFICE.

VIRGIL W. BLANCHARD, OF NEW YORK, N. Y.

STEAM COOKING APPARATUS.

No. 834,225.
Specification of Letters Patent.
Patented Oct. 23, 1906.

Application filed January 22, 1906. Serial No. 297,259.

*To all whom it may concern:*

Be it known that I, VIRGIL W. BLANCHARD, of New York, in the county of New York and State of New York, have invented certain new and useful Improvements in Steam Cooking Apparatus; and I hereby declare that the following is a full, clear, and exact description thereof, reference being had to the accompanying drawings, which form part of this specification.

This invention is an improved apparatus for cooking food by steam, and is adapted for use on or in any ordinary heating or cooking stove, but is particularly designed for use in connection with the gas-heater shown in my application Serial No. 297,240, and with the gas heating-range shown in my application Serial No. 297,251.

The object of the present invention is to provide an apparatus wherein the articles are cooked by steam at a high temperature and under a moderately-low pressure. The steam can be generated in the apparatus itself, and for this purpose I have shown it as adapted to be placed upon and heated by an ordinary range or gas stove or heater; and the invention comprises the novel construction of the cooker and certain novel details of that construction, as will be hereinafter clearly pointed out, and I refer to the claims for summaries of the parts and the combinations of parts for which protection is desired.

Figure 1:
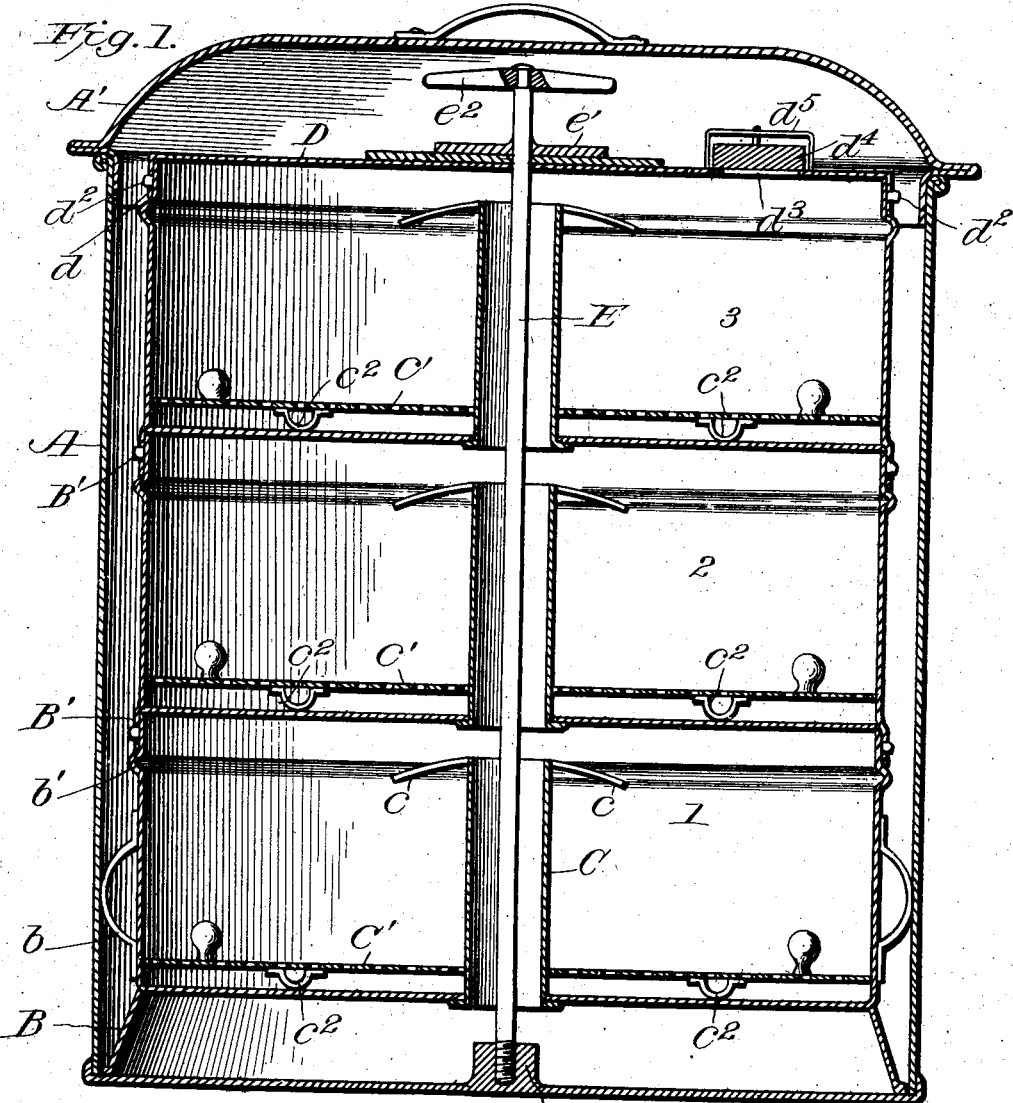
Figure 2:
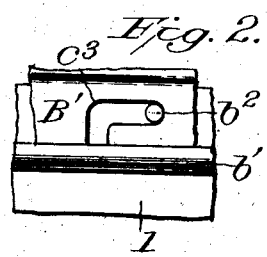
Figure 3:
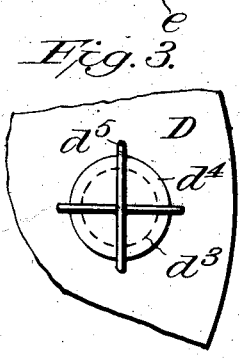
Figure 4:
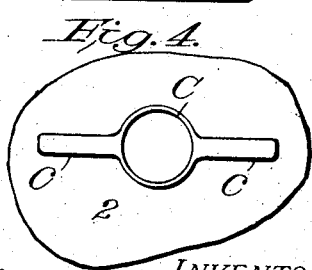

In the drawings, Figure 1 represents a vertical sectional elevation of the complete steam-cooker, and Figs. 2, 3, and 4 are details.

A designates the outer vessel or boiler of the apparatus, which is closed at bottom and provided with a removable cover A' of any suitable construction. Within this outer vessel are placed one or more food-receptacles which are substantially the same in construction, three, 1, 2, and 3, being shown, and are similarly lettered so far as their features of construction are similar.

The lower vessel 1 is a pan-like vessel slightly less in exterior diameter than the interior diameter of the boiler A. This vessel may be provided with or supported on a skirt-flange B, so as to uphold the vessel a slight distance above the bottom of the boiler. The vessel is properly centered or located within the boiler by means of narrow projecting ribs or guards $b$ on its sides, and it has a circumferential bead $b'$ near its upper end for a purpose hereinafter referred to. In the center of the vessel is a vertical tube C, which is open at bottom and top and forms a central flue for the flow of steam upwardly. This tube C may be provided at its upper end with laterally-projecting fingers $c$, which form a convenient means for removing the vessel by hand from the boiler. The vessel 1 may be provided, if desired, with a false bottom $c'$, which is supported upon lugs $c^2$, so that any food placed within the vessel upon this false bottom will not become water-logged or soggy.

The superimposed vessel 2 is constructed similarly to vessel 1, with the exception that instead of the flared skirt-flange B it has an annular depending flange B', adapted to fit over the upper end of vessel 1 and rest upon the bead $b'$, so as to support vessel 2 upon vessel 1 and keep it centrally thereon, the bottom of vessel 2 forming the closure for vessel 1. Similarly the vessel 3 is provided with a bottom flange B', adapted to fit over the upper edge of vessel 2, and the bottom of vessel 3 forms a cover for the top of vessel 2. The tubes C in the several vessels form practically a continuous steam-passage which opens into the upper end of each vessel and supplies steam thereto.

The upper vessel 3 is provided with a removable cover D, provided with a depending flange $d$ to fit the upper edge of vessel 3 or either of the other vessels. Centrally through this cover extends a rod E, the lower end of which is threaded and engages an internally-threaded socket-casting $e$, attached to the bottom plate of the boiler. The rod E is provided with a collar $e'$, which is adapted to engage the cover D when the rod is screwed down, and thus clamp the cover firmly onto the top vessel and also bind the vessels securely together, one on top of the other. The rod E passes through the several tubes C, as shown. The rod may be easily manipulated by means of a hand-piece $e^2$ on its upper end.

If desired, the flanges $b$ may be provided with laterally-projecting pins $b^2$, adapted to engage L-slots $c^3$ in the upper edges of the vessels, so that by partially turning an upper vessel on a lower one it can be locked thereto, as indicated in Fig. 2, or unlocked therefrom. Similarly the cover D may be provided with pins $d$, adapted to engage similar L-shaped slots in the upper edge of the upper vessel. It will be observed from the foregoing that when the vessels are closed and secured, as described, they are substantially steam-tight. The steam is generated in the boiler from a small amount of water poured therein. The amount of water in the boiler ought not at any time be sufficient to enter the vessels and preferably should not rise to the bottom of vessel 1. The steam passes up through the tubes C and into the several vessels 1, 2, and 3. As the vessels are inclosed in a steam-space, there will be very little condensation of steam within the vessels, and practically the food therein will be subjected only to the action of dry steam and the temperature both internal and external of and in the vessels remains practically uniform, so that the food in the vessels is uniformly cooked.

It is desirable to keep the steam at a little more than atmospheric pressure in the vessels, and for that purpose the cover D may be provided with a regulating-valve adapted to confine the steam therein under a low pressure—say two to eight ounces. I have shown the cover as provided with an outlet $d^3$, over which is placed a weight-valve $d^4$, kept in position by cage-wires $d^5$, and this valve will confine the steam until the pressure in the vessels is sufficient to lift the valve and allow the excess pressure to escape into the casing. By using a slight steam-pressure the cooking operations are facilitated.

The steam-cooker can be used with great advantage with and is designed for use in the heat-storing chambers shown in my application, Serial No. 297,254, and by putting the boiler in such a chamber the outer walls thereof are raised to a high temperature, and consequently the steam within the boiler may be superheated with a resultant greatly-increased rapidity and thoroughness of the cooking operation.

Having thus described my invention, what I therefore claim as new, and desire to secure by Letters Patent thereon, is—

1. The combination of a boiler, a vessel therein, supported above the bottom thereof and having a central steam-passage, a cover for said vessel, and a rod passing through the steam-passage and adapted to fasten the cover to the vessel.

2. The combination of a boiler, a nest of vessels therein superimposed one above the other, and each provided with a central steam-supply tube; with a rod passing through the steam-tubes of the several vessels, and detachably engaging a retainer on the bottom of the boiler and adapted to hold the several vessels in position one upon the other.

3. The combination of a boiler, a nest of vessels therein superimposed one above the other, and each provided with a central steam-supply tube, the superimposed vessels forming covers for the lower vessels, and a cover for the uppermost vessel; with a rod passing through the steam-tubes of the several vessels, a retainer for the rod on the bottom of the boiler, said rod adapted to hold the cover upon the topmost vessel and the several vessels in position one upon the other.

4. In a steam-cooker, the combination of a boiler having a cover, a cooking vessel within said boiler of less diameter than the latter and having a central tube for the passage of steam, a cover for said vessel provided with a pressure-regulating valve, and a rod transfixing the cover and passing through the tube of the vessel and engaging a retainer upon the bottom of the boiler.

5. In a steam cooking apparatus, the combination of a boiler having a cover, an internally-threaded socket-piece on the bottom of the boiler, a series of vessels within said boiler, each vessel having an internal upstanding tube of less height than the vessel, a cover for the uppermost vessel, a rod transfixing the cover and passing through the tubes of the several vessels and engaging the socket-casing.

6. The combination in a steam cooking apparatus, of a boiler having a cover, an internally-threaded socket-piece at the bottom of the boiler, a series of vessels within said boiler, each vessel having an internal centrally-upstanding tube of less height than the vessel, and the lowermost vessel having a flange supporting it above the bottom of the boiler, a cover for the uppermost vessel, and a rod engaging the socket-casting and adapted to retain the cover and the several vessels in position within the boiler.

In testimony that I claim the foregoing as my own I affix my signature in presence of two witnesses.

VIRGIL W. BLANCHARD.

In presence of—
JAMES R. MANSFIELD,
L. E. WITHAM.